United States Patent [19]

Perlman

[11] Patent Number: 5,175,765
[45] Date of Patent: Dec. 29, 1992

[54] ROBUST DATA BROADCAST OVER A DISTRIBUTED NETWORK WITH MALICIOUS FAILURES

[75] Inventor: Radia Perlman, Acton, Mass.

[73] Assignee: Digital Equipment Corporation, Maynard, Mass.

[21] Appl. No.: 349,448

[22] Filed: May 9, 1989

[51] Int. Cl.⁵ .................................... H04L 9/30
[52] U.S. Cl. .............................. 380/30; 380/23; 380/25; 380/49; 370/60; 370/92; 370/93; 370/94.1
[58] Field of Search .............. 380/2, 23, 25, 30, 33, 380/48, 49; 370/60, 61, 92, 93, 94.1, 94.3, 99; 364/242.94, 284.4, 940.64

[56] References Cited

U.S. PATENT DOCUMENTS

| | | | |
|---|---|---|---|
| 3,781,815 | 12/1973 | Boudreau et al. | 395/200 |
| 3,979,733 | 9/1976 | Fraser | 395/325 |
| 4,058,672 | 11/1977 | Crager et al. | 370/94.1 X |
| 4,081,612 | 3/1978 | Hafner | 370/60 |
| 4,466,060 | 8/1984 | Riddle | 395/325 |
| 4,527,267 | 7/1985 | Cohen | 370/60 |
| 4,534,024 | 8/1985 | Maxemchuk et al. | 370/85.2 |
| 4,550,397 | 10/1985 | Turner et al. | 370/60 |
| 4,617,657 | 10/1986 | Drynan et al. | 370/60 |
| 4,630,260 | 12/1986 | Toy et al. | 370/60 |
| 4,661,947 | 4/1987 | Lea et al. | 370/60 |
| 4,670,871 | 6/1987 | Vaidya | 370/60 |
| 4,679,189 | 7/1987 | Olson et al. | 370/60 |
| 4,683,563 | 7/1987 | Rouse et al. | 370/16.1 |
| 4,696,000 | 9/1987 | Payne, III | 370/60 |
| 4,701,906 | 10/1987 | Ransom et al. | 370/60 |
| 4,706,080 | 11/1987 | Sincoskie | 340/825.02 |
| 4,740,954 | 4/1988 | Cotton et al. | 370/60 |
| 4,742,511 | 5/1988 | Johnson | 370/85.9 |
| 4,755,986 | 7/1988 | Hirata | 370/60 |
| 4,787,082 | 11/1988 | Delaney | 370/85 |
| 4,787,083 | 11/1988 | Tanaka | 370/85.1 |
| 4,811,337 | 3/1989 | Hart | 370/85.13 |
| 4,825,206 | 4/1989 | Brice, Jr. et al. | 340/825.02 |
| 4,969,146 | 11/1990 | Twitty et al. | 370/94.1 X |
| 4,975,952 | 12/1990 | Mabey et al. | 370/94.1 X |

OTHER PUBLICATIONS

Rivest et al. "A Method for Obtaining Digital Signatures and Public Key Cryptosystems", *Communications of the ACM*, vol. 21, No. 2, Feb. 1978, pp. 120–126.

Dolev "Unanimity in an Unknown and Unreliable Environment", available from the IEEE, New York, N.Y., under catalog number CH1695-6/81/0000/159, 1981.

Diffie et al. "New Directions in Cryptography", *IEEE Transactions on Information Theory*, vol. IT-22, No. 6, Nov. 1976, pp. 644–654.

Perlman "Fault-Tolerant Broadcast of Routing Information", Computer Networks 7 (1983), North-Holland, Inc., pp. 395–405.

Humblet et al. "Topology Broadcast Algorithms", Computer Networks and ISDN Systems 16 (1988/89), North-Holland, Inc., pp. 179–186.

Gallagher et al. Chapter 5 of *Data Networks*, Prentice-Hall, Englewood Cliffs, N.J., 1987.

*Primary Examiner*—Bernarr E. Gregory
*Attorney, Agent, or Firm*—Fish & Richardson

[57] ABSTRACT

A public-key encryption system is used to reliably transmit packets over a network subject to malicious failures. Each node on the network is associated with a public and private key. A transmission over the network identifies its originating node and also includes a digital-signature code word generated by encoding predetermined portions of the transmission using the private key of the originating node. When a transmission is received, the receiving node verifies that the transmission was originated by the identified originating node by manipulating the packet contents using the public key associated with the originating node. The packet is accepted only if the digital-signature code word in the packet corresponds to contents of the packet and the public key of the originating node.

19 Claims, 8 Drawing Sheets

ROBUST DATA BROADCAST OVER A DISTRIBUTED NETWORK WITH MALICIOUS FAILURES

FIELD OF THE INVENTION

The invention relates to the field of distributed networks. More particularly the invention relates to robustly broadcasting data over networks containing one or more improperly operating network nodes.

BACKGROUND OF THE INVENTION

A computer network enables various devices, such as processors, mass storage devices, and printers to communicate with each other over high speed bi-directional communication links. The devices are connected, that is, interfaced, to the network, and thus transfer data to and from the network, through nodes. The nodes are interconnected by the communication links. Networks may be of any size. For example, a network may contain several hundred or several thousand nodes, enabling devices at many different locations to communicate.

The nodes at either end of a communication link are commonly referred to as neighboring nodes. To send information to non-neighboring nodes, a node transmits the information over one or more network communication links to one or more neighboring nodes, and the neighboring nodes transmit the information to their neighboring node(s), etc.

Data and control messages are transmitted over the network in the form of packets. The packets contain, in addition to the data or control messages, network specific information, such as the identity of the first node transmitting the packet on to the network, i.e., the originating node. This information is in a first section of the packet referred to as a header. The header section immediately precedes the data or control message.

This invention involves broadcasting packets over a network. Broadcasting consists of sending a packet to every node on the network. This is easily accomplished over certain networks, such as networks configured in relatively simple topologies, i.e., rings. However, it is not as easily performed over networks which are configured with multiple paths between nodes.

One well known method of broadcasting packets over the network is flooding. Flooding requires a node receiving a packet to transmit it to each of its neighboring nodes, except the node from which it was received. The node thus copies the packet and transmits the copies over the appropriate communication links to the neighboring nodes. Copies of the packet eventually travel throughout the network to every node over every communication link. Typically multiple copies of the packet travel to every node. Thus the nodes must process each of the copies.

A packet traveling over a network may be lost or corrupted due to improperly operating nodes, that is, nodes with hardware faults or software glitches or bugs, and/or network misconfigurations. Thus it is desirable to design a robust transmittal scheme to deliver packets over a network containing improperly operating nodes. This scheme should also deliver packets over a network which is misconfigured.

Improperly operating nodes may delay packets, sporadically lose packets, alter packets, fail to transmit packets to or from a particular node and thus disrupt the broadcasting of one or more specific packets. An improperly operating node may also generate such a high volume of traffic, for example, by transmitting packets at a rate which is faster than the network nodes can process, so as to congest the entire network. Thus a mechanism is desirable to transmit packets successfully over a network containing improperly operating nodes. This mechanism should also effectively control the transmission of duplicated packets.

Nodes may operate "maliciously" as a result of, for example, network sabotage. A malicious node may delay, alter and/or fail to broadcast particular packets or it may purposefully broadcast inaccurate or conflicting information in a form which appears correct. The recipient of this apparently correct information can not determine whether it is reliable or unreliable. Thus a mechanism is desirable to select and broadcast only reliable information over a network containing malicious nodes.

SUMMARY OF THE INVENTION

The invention is a network containing nodes which broadcast packets using a robust flooding scheme. The broadcasting scheme minimizes potential problems caused by improperly operating nodes by allocating network resources specifically to each node and carefully monitoring those resources.

In brief summary, a node allocates memory locations specifically to each of the other nodes on the network. The node stores in these locations the newest valid packets originated by each of the other network nodes. Specifically, each time a node receives a packet it first determines if the packet is valid. Then, for each valid packet the node determines if it is the newest one received from the packet-originating node. If the packet is not both valid and new, the receiving node discards it. If the node determines that the packet is valid and new, it updates the associated memory location by storing a copy of the new packet. It also queues the packet for further transmission to the appropriate neighboring nodes by setting flags associated with the communication links leading to those neighbors to indicate that the packet is ready to be transmitted over the links. Thereafter, when a communication link becomes available, the node sends, in turn, the packets for which the flags associated with the link are set.

The present transmittal scheme requires including as part of the packet header two items in addition to the identifier of the packet originating node, namely, a sequence number and a digital-signature code word. The sequence number is a count of the packets originated by the node. The digital-signature is a code word which is generated by manipulating both packet specific information and node specific information.

Each node has associated with it a private key, that is, a number known only to the node, and a related public key, that is, a number which is known to all the nodes on the network. A node receiving a packet manipulates the contents of the packet and the public key associated with the packet originating node to test the validity of the packet.

To determine if a valid packet is the newest one from a particular node, the receiving node compares the packet sequence number with the sequence number of the stored packet associated with the packet-originating node. If the sequence number of the received packet is greater than the sequence number of the stored packet, indicating the received packet is new, the receiving node updates the associated memory location and queues the packet for transmission to the appropriate neighboring nodes(s) by setting the appropriate flags.

If the sequence numbers of the received packet and the stored packet are equal, the received packet is normally presumed to be a duplicate, and the receiving node discards it. Finally, if the sequence number of the received packet is less than the sequence number of the stored packet, indicating the received packet is older, the receiving node discards the received packet. It then sends a copy of the (newer) stored packet back to the transmitting node to update that node's memory. Thus only the newest valid packet associated with the originating node is further transmitted.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
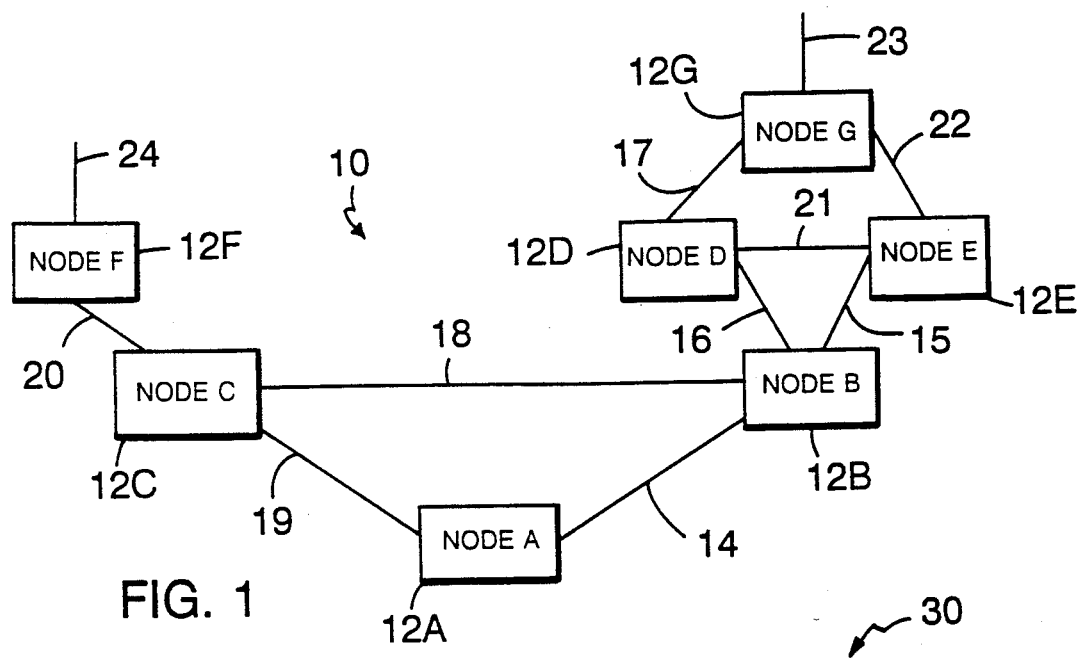
FIG. 1 is a block diagram of a distributed network.

FIG. 1 depicts a network 10. The network 10 includes nodes 12A-12G interconnected by communication links 14-24. Various nodes 12 operate with one or more devices, such as mass storage devices, data processors, terminals, etc. (not shown), connecting the devices to the network and enabling them to communicate.

Figure 2:
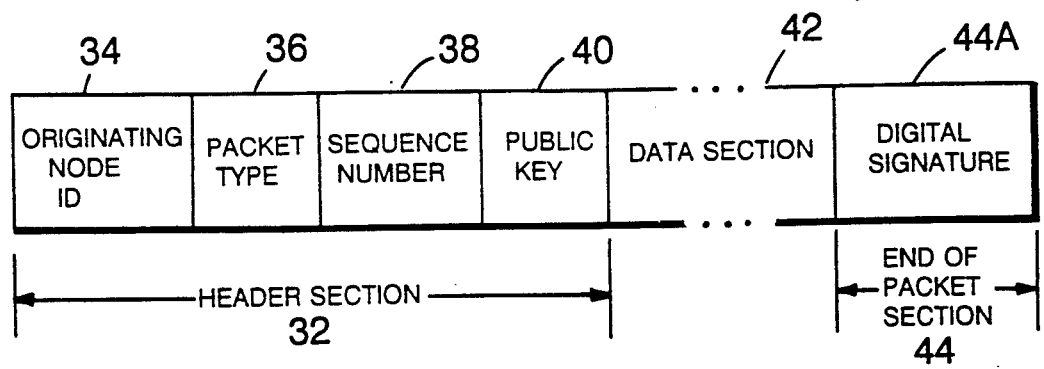
FIG. 2 is a illustration of a data packet.

Data is transmitted over the network in the form of packets, each of which is a stream of bits in a specified format, as described in more detail with reference to FIG. 2 below. A data packet originated by node A travels to a destination node, for example, node G, over the network using any of a number of paths, or routes. If the packet is sent over the network by conventional flooding originating node A copies the packet and sends it over links 14 and 19 to receiving nodes B and C, respectively. Node B then copies the packet and sends the copies over links 15, 16 and 18 to nodes E, D and C, respectively. Similarly, node C copies the packet and sends it over links 18 and 20 to nodes B and F, respectively. Nodes B and C have now received two copies of the packet.

When a node copies a packet it duplicates the entire packet. Depending on the network transmittal scheme, the node may then alter a transmission specific portion of the packet, for example, increment a node count which indicates the number of nodes through which the packet has traveled. Thus the packet copy which the node transmits contains exactly the same information as the packet received by the node, except for the transmission specific information.

Node B copies the packet received from node C and sends it again to nodes E, D and also sends a copy to node A. Node D copies the packet received earlier from node B and sends it to nodes E and G over links 21 and 17, respectively. Node E copies the packet received from node B and sends it to nodes D and G over links 21 and 22. Node G, the destination node, has thus received two copies of the packet and nodes B and C, which are still sending copies of the packet to other network nodes 12, have each received three copies of the packet. Flooding then continues with packets repeatedly traveling over the communication links to the various nodes 12.

If all the nodes 12 are functioning properly the packet and various copies of it circulate as described above, arrive at the appropriate destination node 12, and/or are removed from the network. If, however, one of the nodes 12 is corrupted, for example, by bad software, packets may be altered, indiscriminately duplicated, prematurely removed or over-circulated.

ROBUST BROADCASTING

The network 10 uses a robust flooding mechanism to transmit each packet to every node on the network. With the robust flooding mechanism, a packet originated by a properly functioning node reaches all the nodes on the network that are reachable by a non-faulty path. The robust flooding mechanism further allocates available bandwidth fairly among the nodes. Thus it ensures that packets from each originating node are transmitted, in turn, over the network 10 and prevents one node from monopolizing the network.

To implement the robust flooding mechanism, each node 12 stores the newest valid packet originated by each of the other network nodes 12. The node 12 stores the various packets in memory locations allocated specifically to each of the other network nodes. When a node 12 receives a packet over the network it compares the packet with the stored packet associated with the same originating node to determine which packet is newer. The node discards any packets which are older or duplicates, transmitting only new packets, as discussed in more detail with reference to FIG. 4 below.

Each node 12 also stores node identifying information associated with each of the nodes 12. The mechanism by which the nodes acquire the node identifying information is discussed below with reference to FIG. 5. The nodes 12 use the node identifier information, namely, node identifiers and associated cryptographic public keys, to verify the validity of the received packets. A packet is determined to be valid if it is originated by the appropriate node and accurately transmitted, as discussed in more detail below with reference to FIG. 4. The validity of a received packet is typically determined before the packet is compared with a stored packet from the same originating node to determine the relative vintage.

The public key used to test the validity of a received packet is a number which is used in conjunction with a related number, a private key. [For more information on the use of public keys and private keys generally to verify data, see R. L. Rivest, A. Shamir, and L. Adleman, "A Method for Obtaining Digital Signatures and Public Key Cryptosystems", *Communications ACM*, vol. 21, pp 120-126, Feb. 1978]. As the names imply, a public key is known to many nodes while a private key is known only to a particular node. Each node has associated with it one private key and a corresponding public key. The nodes use the two keys in a conventional manner to ensure that receiving nodes are able to test the validity of a packet, that is, determine that a particular node originated the packet and that the packet contents have not been altered during transmission.

When a node originates a packet it manipulates the contents of the packet and its private key to generate a digital-signature code word. Thus the node applies the packet contents and the private key, as arguments, to a signature generating function and generates a digital-signature code word which is specifically associated with both the packet data and the originating node. If the same node generates a different packet, it generates a different digital-signature code word corresponding to the different packet data. Similarly, another node encoding the same packet generates a different digital-signature code word because it uses a different private key.

The originating node transmits the generated digital-signature code word as a part of a packet. In order to test the validity of the packet the receiving node manipulates, using a verification function, the packet contents, including the digital-signature code word, and the public key associated with the node assumed to be the originating node. The result of the manipulation is typically a binary output signal, with one value signifying that the packet is a valid one and the other value signifying that the packet is an invalid one. The signature generating function and the verification function are conventional functions well known to those skilled in the communications art.

Upon receiving a packet, a node 12 first tests the validity of the packet using the verification process set forth above. If the packet is a valid one, the node next determines if the received packet is the newest one that it has received which is associated with the packet-originating node. Thus the node compares certain chronology information in the received packet, for example, a packet sequence number or a time stamp, with the chronology information in the stored packet and selects the packet which is the newer of the two. A packet sequence number is a count of the packets originated by a node. A time stamp is an indication of the time a packet is originated, i.e., the reading on a node resident clock.

If the comparison shows that the received packet is newer, the node updates the associated memory location with the packet and queues the packet for further transmission. Otherwise, the node discards the (older) received packet. The operation of a node receiving a packet is discussed in more detail with reference to FIG. 4 below.

As indicated above, data is transmitted over the network in the form of packets. FIG. 2 illustrates the format of a packet 30. The packet 30 contains a header section 32, a data section 42 and an end of packet section 44. The header section 32 contains four fields, namely, an originating node identity field 34, a packet type field 36, a sequence number field 38, and a public key field 40. The public key field 40 may be omitted as discussed below with reference to FIG. 3.

The originating node identity field 34 contains the network identifier associated with the node originating the packet. The packet type field 36 contains information describing the type of packet, for example, data packet, control message packet, etc.

The sequence number field 38 contains a count of the packets originated by the originating node. The most recent packet originated by the node contains the highest packet number and thus the relative vintage of two packets can be determined by comparing the sequence numbers. The size of the sequence number field 38 is chosen such that it is unlikely that the sequence will wrap-around, that is, start again at the beginning. For example, if the sequence number field 38 is 64 bits long and the node originates a packet every microsecond it will take 400,000 years for the sequence number to wrap-around.

If a node does assign the maximum sequence number to a packet, the node acquires new public/private keys and it becomes a new node. The new node starts its sequence number at the beginning of the sequence, and thus the node gives the next packet it originates the lowest possible sequence number. As soon as the network nodes learn of the newly identified node, as discussed below with reference to FIG. 5, the nodes essentially forget the previous identity. Thereafter, the network nodes discard any packets containing the old node identity. Thus the problems typically associated with wrap-around sequence numbers are relatively easily avoided using the robust flooding scheme.

The public key field 40 contains the public key associated with the originating node. The end of packet section 44 contains a digital-signature field 44A. This field contains the digital-signature code word associated with the contents of the header and data sections of the packet and the originating node's private key. It will be appreciated by those skilled in the art that the digital signature field 44 may be included in the header section 32 of the packet instead of the end of packet section 44 without changing the operation of the robust flooding mechanism.

Figure 3:
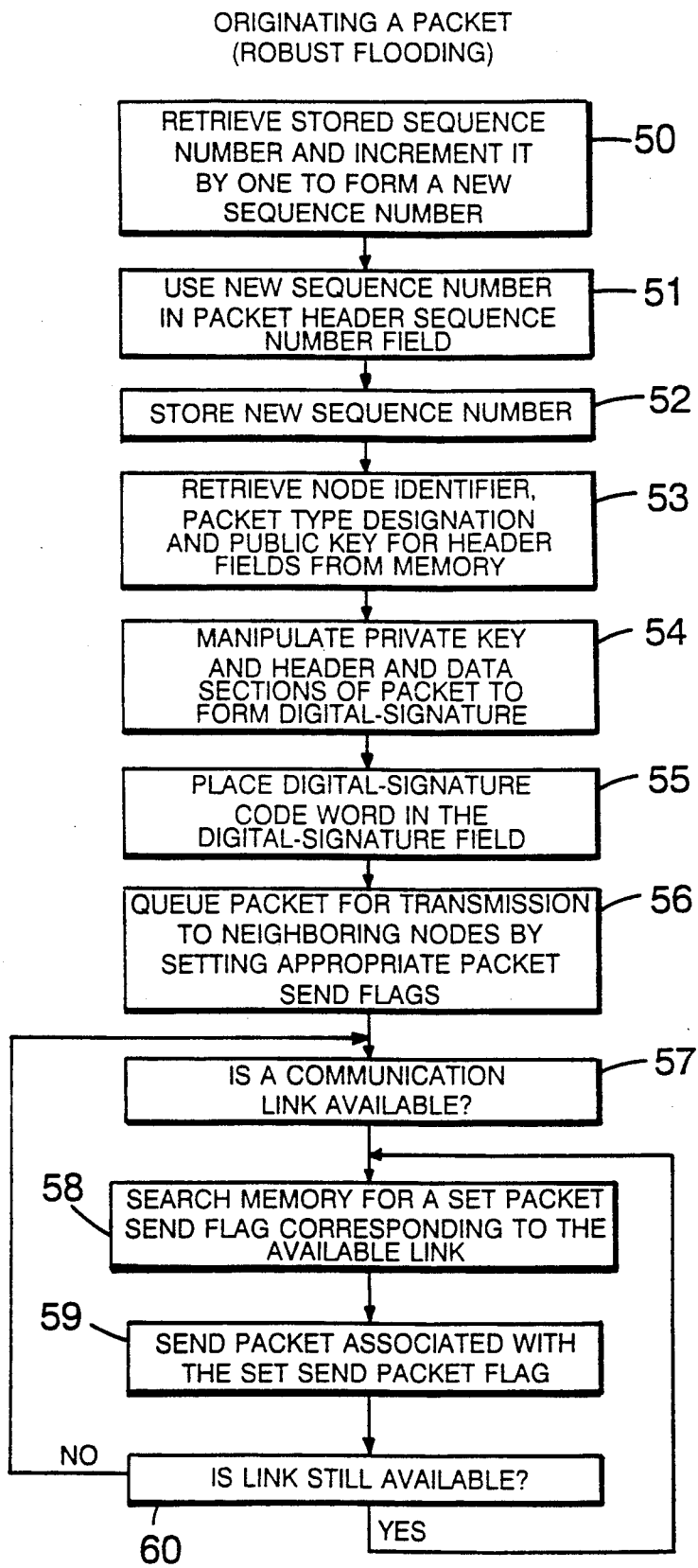
FIG. 3 is a flow chart describing the activities of a node originating a packet using the robust flooding scheme.

Referring now to FIG. 3, a node 12 originates a data packet 30 by first retrieving from memory the sequence number, or count, of its most recent packet. The node 12 increments the retrieved sequence number by one and uses the new number as the contents of the packet sequence number field 38 (steps 50-51). It then updates its memory by storing the new sequence number (step 52). The node next includes the designation for the type of packet it is producing in the packet type field 36. To complete the header section 32, the node retrieves from its non-volatile memory its own node identifier and public key and uses them as the contents of the packet originating node identity field 34 and the public key field 40, respectively (step 53).

The node next generates a digital-signature code word by manipulating its private key and the contents of the packet header and data sections (step 54). The generated digital-signature code word is then used as the contents of the packet digital-signature field 44A. (step 55). The packet is now ready to be transmitted, and the node 12 queues the packet for transmission to each of its neighboring nodes.

The node queues the packet for transmission by setting PACKET SEND flags (step 56). Each PACKET SEND flag corresponds to a communication link leading to a neighboring node. Thus a node sets a particular PACKET SEND flag as an indication that the packet associated with the flag is to be sent to the neighboring node over a particular communication link. Accordingly, an originating node sets the flags corresponding to every one of its communication links, and a node further transmitting a valid received packet sets the PACKET SEND flags corresponding to the communication links leading to every neighboring node except the node which previously transmitted the packet.

The nodes use the flags to allocate fairly among the network nodes limited network bandwidth. A node sets the appropriate PACKET SEND flags for each packet which is ready for transmission and thus queues the packets for transmission over the communication links to which the flags correspond. When a communication link becomes available, the node scans its data-base in a "round-robin" fashion, starting at the flag which signaled the previous transmission, until it encounters a set PACKET SEND flag indicating a packet is to be sent over the link (steps 57–58). The node then transmits the packet associated with the flag over the link to the associated neighboring node (step 59). If the link is still available, the node scans for another set PACKET SEND flag associated with the link (step 60). When one is found, the node transmits the appropriate packet. In this way, the node transmits over an available communication link, in turn, packets associated with each of the network nodes.

Eventually, the node scans around the entire database and returns to a set flag associated with an earlier transmitted packet. The node again sends the packet and again scans for the next set flag. The node continues to transmit the packets associated with set PACKET SEND flags whenever the appropriate communication links become available.

In the preferred embodiment a second flag and a special "acknowledgment packet" are used by a receiving node to acknowledge receipt of a valid packet. The receiving node sets the second flag, an ACK flag, to indicate that it has a transmission to make over the communication link. When it is the node's turn to transmit a packet over the link, that is, when the set ACK flag is the flag signalling the next transmission, the node generates an acknowledgment packet and transmits it to the packet transmitting node.

When the transmitting node receives a valid acknowledgment packet it clears the PACKET SEND flag corresponding to the acknowledged packet and the communication link over which the packet was sent. The node will not then re-send the packet over this link. The node thus frees network bandwidth for the transmission of other, as yet unacknowledged, packets. The use of the second flag, an ACK flag, and the acknowledgement packet are discussed in more detail below with reference to FIGS. 4A through 4C.

The copies of the packet transmitted by the originating node to the neighboring nodes are duplicates of the originated packet. The packets do not contain any information which requires updating during transmission. Thus the packets received by every network node are duplicates of the packets originated by the originating nodes.

Figure 4A:
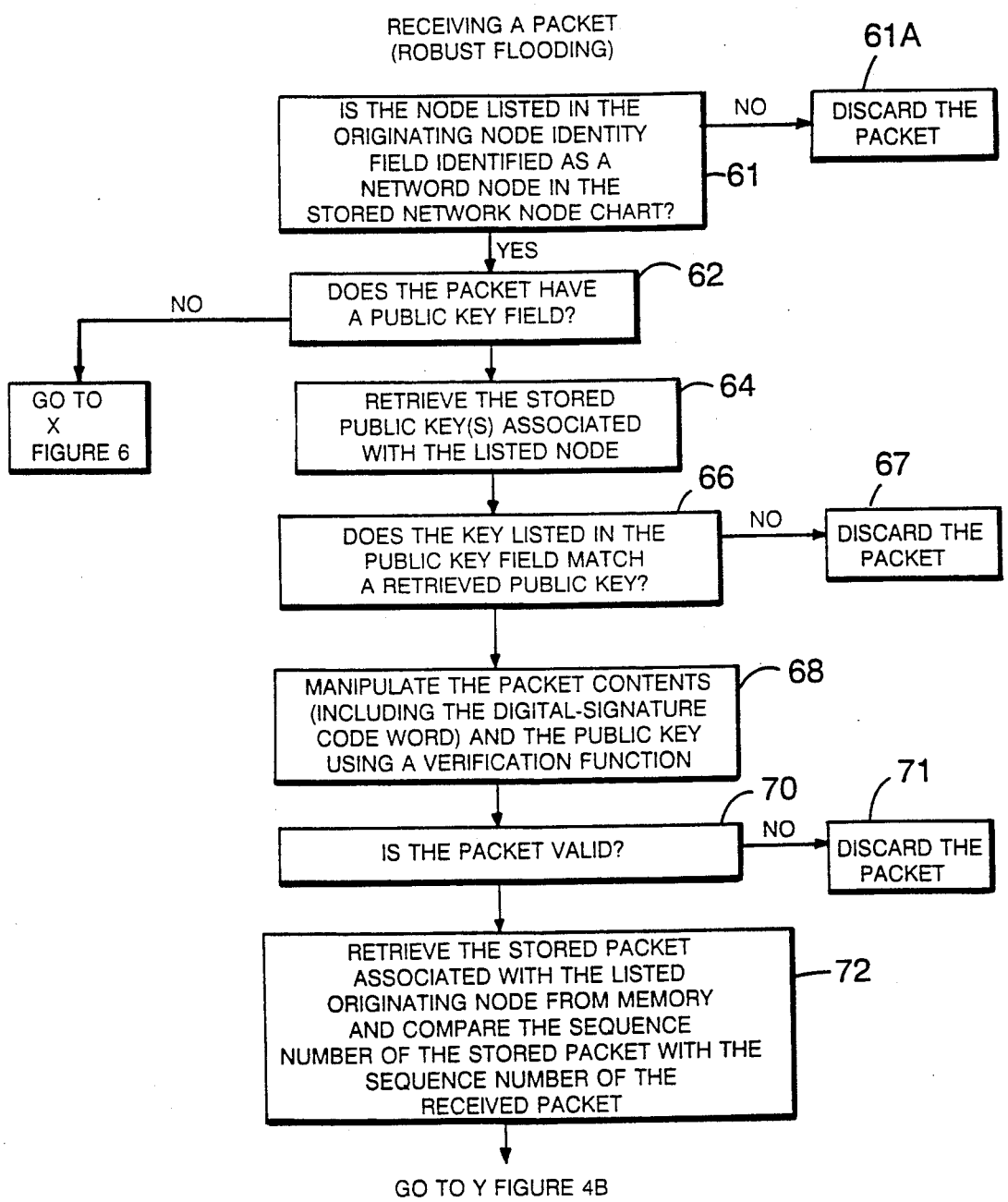
FIGS. 4A and 4B are flow charts describing the activities of a node receiving a packet using the robust flooding scheme.

Referring now to FIG. 4A, the neighboring nodes receive the transmitted packets and first check that the node listed in the packet as the originating node is a node on the network. Specifically, the node compares the contents of the packet originating node identity field 34 with the stored node identifiers (step 61). If the node is not one for which a node identifier is stored, the receiving node discards the packet (step 61A).

If the receiving node does have stored the node identifier corresponding to the originating node 12, the receiving node 12 retrieves from memory the associated public key (steps 62–64). Receiving node 12 then compares the contents of the public key field 40, if any, with the retrieved public key (step 66). If the two keys do not match, indicating that the packet was not originated by a properly functioning node, the receiving node discards the packet (step 67).

If the two keys match, receiving node 12 applies to the verification function the contents of the packet, including the digital-signature code word and the public key. The node generates a verification output value indicating either that the packet is valid, that is, originated by the originating node listed in the packet and reliably transmitted, or that the packet is invalid (steps 68–70). If the node determines that the packet is invalid, the node discards it (step 71).

If the packet is valid, the receiving node next determines if the packet is the newest one associated with the originating node. To this end, the receiving node 12 retrieves the packet stored in the memory location assigned to the originating node. It then compares the contents of the sequence number fields 38 of the received packet and the stored packet (step 72). There are three possible outcomes, each of which requires a different node operation: the sequence number of the received packet is larger, the sequence number of the stored packet is larger, or the sequence numbers are equal.

Figure 4B:
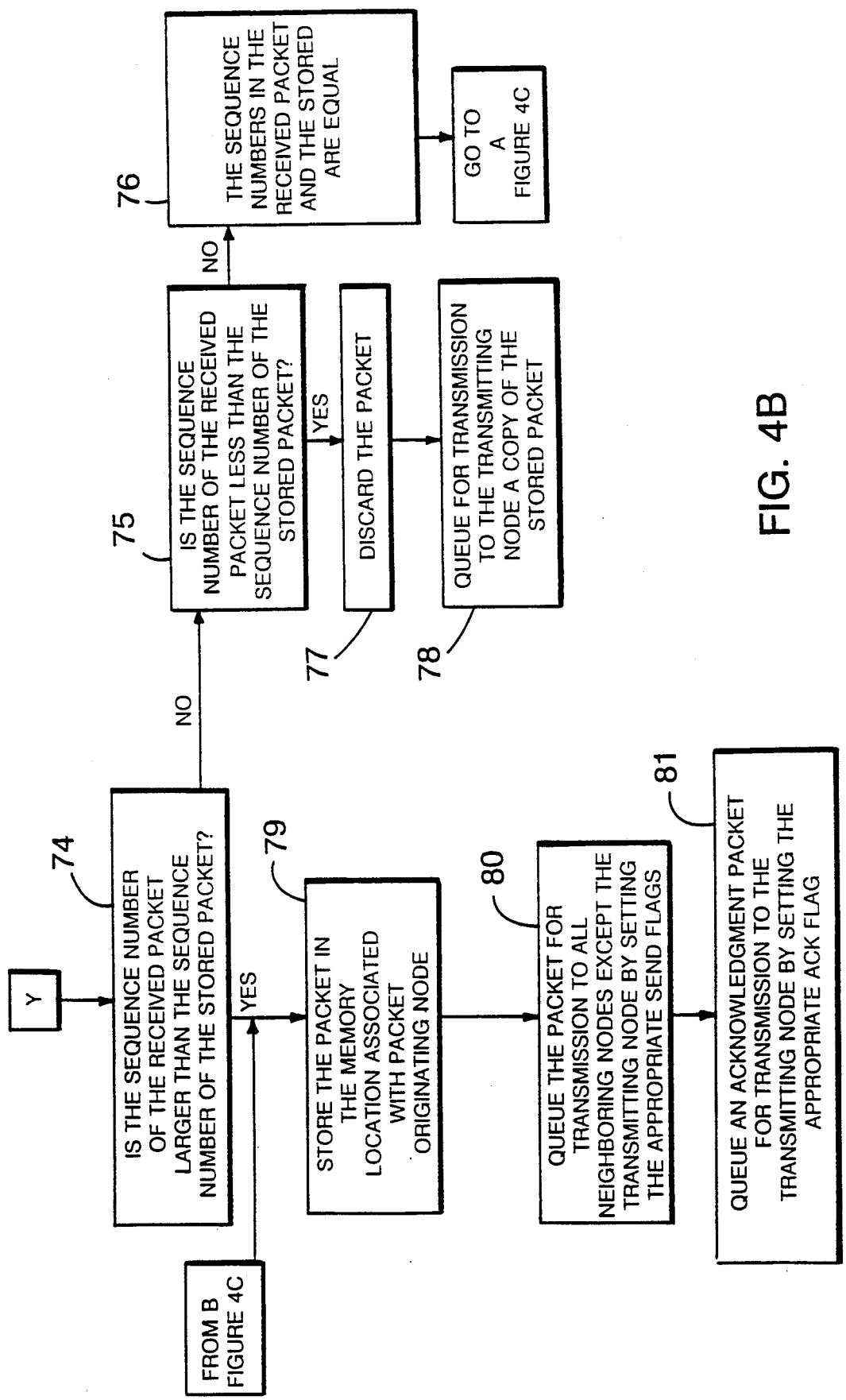

Referring to FIG. 4B, if the sequence number of the received packet is larger than the sequence number of the stored packet, the received packet is considered newer (step 74). The receiving node 12 thus stores the new packet in the memory location allocated to the packet originating node (step 79). Thereafter, it queues the packet for further transmission by setting the appropriate PACKET SEND flags (step 80).

The receiving node 12 next sets an ACK flag to indicate that it will transmit an acknowledgment packet when it is the node's turn to use the communication link. When the set ACK flag signals the next transmission over the link, the node prepares an acknowledgment packet to send to the transmitting node to acknowledge receipt of the data packet (step 81). The acknowledgment packet contains: (i) the identifier of the data packet originating node; (ii) the sequence number of the data packet; (iii) the public key used to decode the packet digital-signature; and (iv) the packet digital-signature. All this information is copied from the data packet. Each item is included in the packet to identify distinctly the data packet being acknowledged. When the acknowledgment packet is ready for transmission, the node stores it in an appropriate memory location and sets an ACK flag to queue the packet for transmission to the transmitting node.

The second possible outcome of the sequence number comparison is that the sequence number of the stored packet is larger than the sequence number of the received packet (step 75). This indicates that the received packet is a duplicate of an earlier received packet, and thus, the receiving node discards the received packet (step 77). It also indicates either that the transmitting node may be improperly operating by failing to store the most recent packet from the originating node, or that the node has not yet received the newer packet and the surrounding nodes may be operating improperly by failing to transmit particular packets.

In order to update the memory of the transmitting node with the newer packet, the receiving node queues for transmission to the transmitting node a copy of the stored packet (step 78). Thus the receiving node sets the appropriate PACKET SEND flag as discussed above with reference to FIG. 3 (step 78). When the transmitting node receives a valid copy of the packet, it updates the corresponding memory location by storing therein the received packet.

Figure 4C:
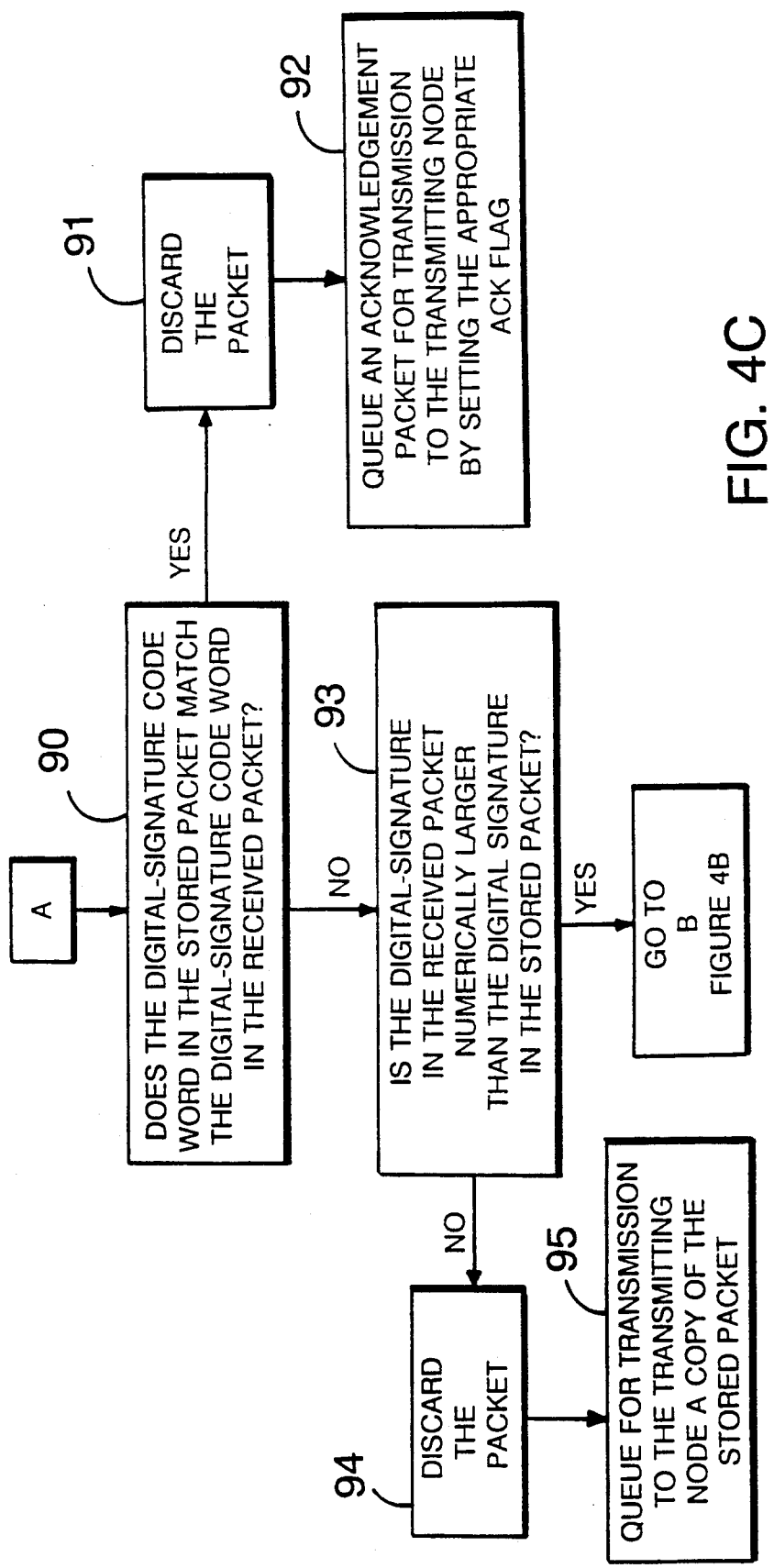
FIG. 4C is a flow chart of the operations of a node receiving a data packet with a sequence number matching the sequence number of a stored packet.

The third possible outcome of the sequence number comparison is that the numbers are equal (step 76). This indicates that the received packet may be a duplicate of the stored packet. However, the received packet could be a newer packet from the originating node if, for example, the node incorrectly recovered a lost packet count. Referring now to FIG. 4C, to determine if the two packets are duplicates the node compares the digital-signature code words (step 90). If the digital-signature code words are the same, the packets are considered to be duplicates and the receiving node removes the received packet from the network (step 91). It then prepares and queues for transmission to the transmitting node an appropriate acknowledgment packet (step 92).

If the digital-signature code words are not the same, the node can not determine which packet is newer; it must simply select one of the packets. In the preferred embodiment, to make the selections consistent, the node selects as the newer packet the one containing the numerically higher digital-signature (step 93). Thus if the received packet contains the numerically higher digital-signature, the receiving node updates its memory and queues the packet for further transmission, as set forth above. If the stored packet contains the numerically larger signature, the node discards the received packet and queues for transmission to the transmitting node a copy of the stored packet (steps 94-95).

The packet containing the numerically larger signature may actually be the older of the two packets, that is, the first of the two originated by the originating node. If this is the case, the older packet essentially overtakes the newer (smaller signature) packet, and thus the nodes end up transmitting the older packet and discarding the newer one. However, this does not mean that the newer packet is lost.

Whenever a node receives the newer packet and determines that it should be considered the older packet, due to the digital-signature codeword comparison, the receiving node transmits a copy of the stored (older) packet to the transmitting node. The transmitting node, in turn, transmits to the node from which it received the packet a copy of the older packet, i.e., the packet currently being broadcast. Eventually, a node transmits the (older) packet to the packet-originating node. When the node examines the received packet it determines that the packet is not the one it last transmitted. The node then re-issues the newer packet with a larger sequence number, and broadcasts it throughout the network.

A node may allocate more than one memory location to the other nodes on the network. In this way the node can store, for example, the latest three packets from a particular originating node. When the node receives a packet in can compare the packet with the latest three packets received from that node and determine if the received packet is new or a duplicate of one of the earlier received packets. The robustness of the broadcasting scheme is thus improved, however, the cost of the improvement is a larger node memory.

Figure 5:
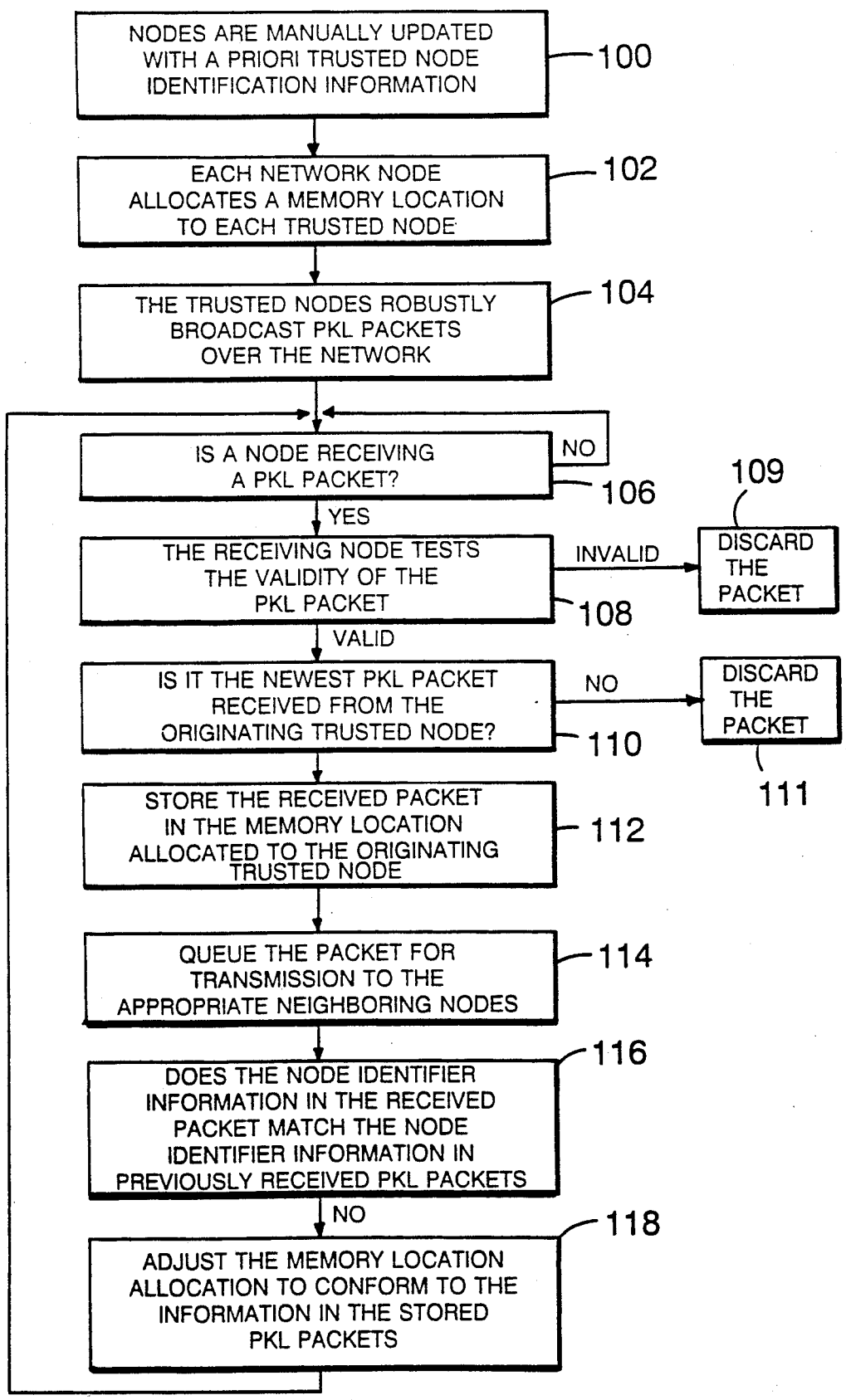
FIG. 5 is a flow chart describing the node activities associated with acquiring network node identity information.

Referring now to FIG. 5, the nodes acquire the node identifier-public key information used to formulate the network node charts from public key list (PKL) packets originated by "trusted nodes". The trusted nodes are a predetermined number of network nodes about which the remaining network nodes have certain a priori knowledge. The a priori knowledge consists of the network identifiers and the public keys associated with the trusted nodes. The nodes also know, a priori, their own node identifiers, their own public and private keys, and a predetermined maximum number of nodes which may be on the network at any given time.

Before the network is operational the information which the nodes must know a priori is written to a resident non-volatile memory in each node (step 100). The trusted node information is manually maintained. Therefore, the node memories must be updated each time a trusted node is added to or removed from the network.

When the network becomes operational the trusted nodes broadcast their PKL packets throughout the network using the robust flooding mechanism described above (step 104). Each node receiving a first PKL packet determines if the packet is valid, that is, if the packet has a valid digital-signature code word and if it lists an appropriate number of nodes (step 106). Thus the node uses the stored public key associated with the packet originating trusted node to test the validity of the packet digital signature, and it uses the stored maximum node number to determine if the packet node identifier-public key list contains an appropriate number of nodes (steps 108-111).

If the PKL packet is valid, the receiving node stores it in a memory location allocated to the originating trusted node and queues it for transmission to the appropriate neighbors (steps 106-114). The node then allocates a memory location for each node listed in the PKL packet. The allocated memory locations are used to store the newest valid packets associated with the corresponding network nodes (step 118).

When the node next receives a PKL packet it again determines if the packet is valid and new. If the packet is valid and new, the node stores the PKL packet in the memory location allocated to the packet originating trusted node (step 112). The node then compares the node identifier-public key list in this packet with the lists in the previously received PKL packets (step 116). If the PKL list in the received packet does not match a list in a previously received PKL packet, the node re-adjusts the allocation of memory locations based on the network information contained in all of the stored PKL packets (step 118). Thus the node allocates new memory locations for the nodes first identified in the received PKL packet list and frees memory locations allocated to nodes which no longer appear on any of the stored PKL lists. If the list in the received packet matches a previously received list, the node leaves the memory location allocation unchanged.

The fact that each network node has a priori knowledge of the trusted nodes is what allows the trusted nodes to broadcast the PKL packets. A node cannot broadcast packets, either PKL packets or data packets, unless the receiving nodes know the node identifier and public key associated with the originating node. Thus the trusted nodes can at any time broadcast PKL packets to the network nodes. However, a regular network node cannot broadcast any packets until the regular nodes receive a PKL packet containing an identifier-public key listing for it.

A node may receive a valid PKL packet containing one or more incorrect node identifier-public key pairings. This incorrect information contradicts the information in the PKL packets received from the other trusted nodes. For example, a node identifier may be paired with a particular public key in one PKL packet and with a different public key in another PKL packet, and only one of the pairings is correct. In response to receiving valid PKL packets containing these listings, the receiving node designates memory locations for both of the node identifier-public key pairings, that is, a location for every node identifier-public key pairing listed in a valid PKL packet. In this way the node is ready to handle packets from every (possible) node on the network.

Using PKL packets to inform the nodes about the other nodes on the network simplifies the task of adding to the network a non-trusted, or regular, node. The new node basically notifies at least one of the trusted nodes that is on the network and informs the trusted node of its identity and public key. The actual mechanism by which the node informs the trusted node of its identity is beyond the scope of this invention.

Each time the trusted node receives information concerning a new node it adds the information to its node identifier-public key list and robustly broadcasts an updated PKL packet throughout the network. A node receiving an updated PKL packet designates a memory location for the new node and the new node may then broadcast packets.

Figure 6:
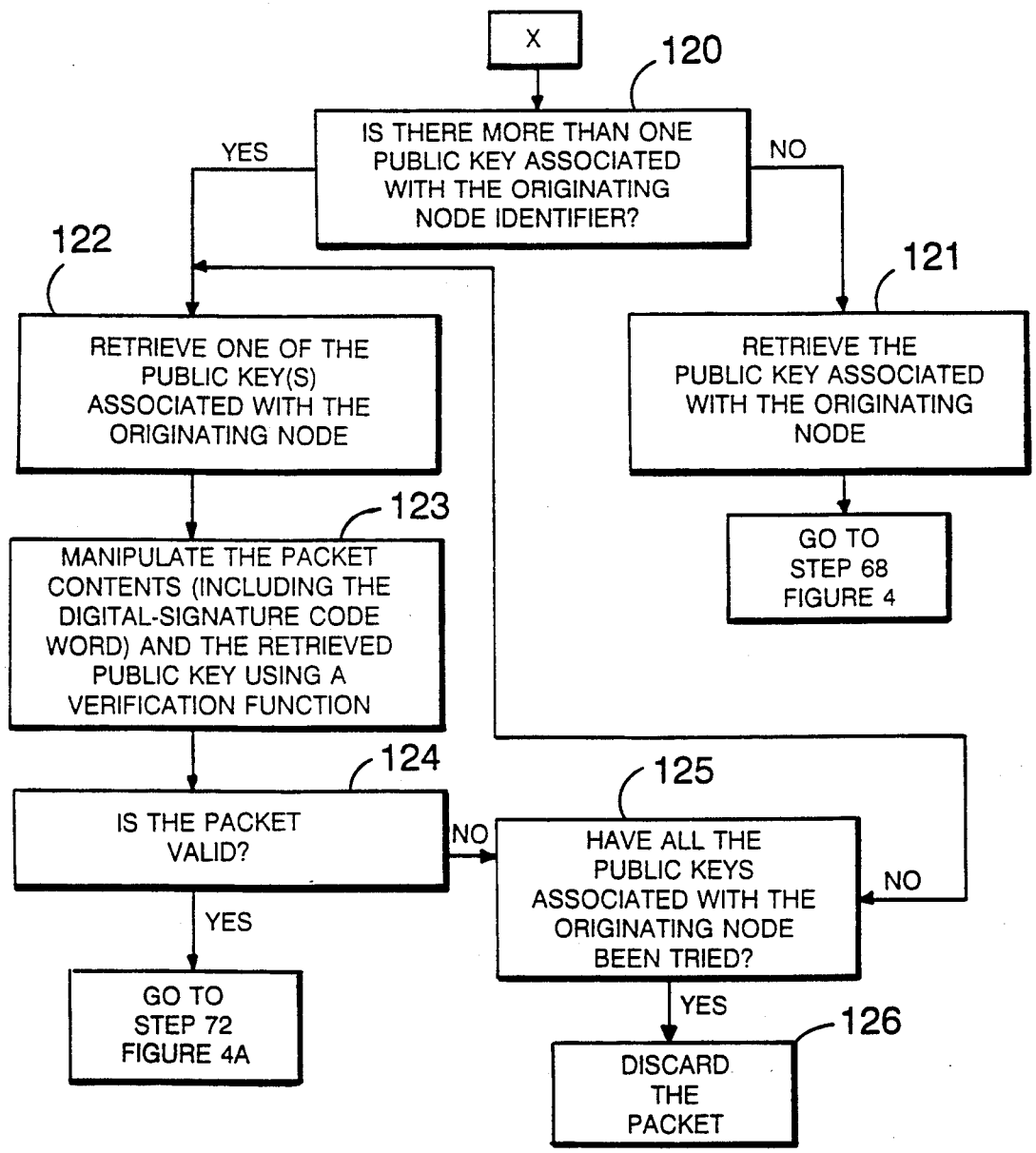
FIG. 6 is a flow chart of the operations of a node receiving a data packet without a public key field.

As discussed above, the public key field 40 may be omitted from a packet 30. Referring now to FIG. 6, if the node receives a packet without the public key field, the receiving node 12 must retrieve from memory the public key associated with the originating node. However, the receiving node may have stored several public keys associated with the node, corresponding, for example, to contradictory PKL packets (step 120). Accordingly, when the receiving node receives a data packet which does not contain a public key, it retrieves from memory a first value for the public key and attempts to test the validity of the packet using this public key (step 122).

If the packet is found to be invalid, indicating either that the packet is in fact invalid or that the public key used in the test is not the appropriate one, the node retrieves another associated public key and again attempts to test the validity of the packet (steps 123-125). This process is repeated until either an appropriate key is found or all the keys associated with the listed originating node have been unsuccessfully tried and the packet is determined to be invalid (step 126).

Including the public key in the packet eliminates the need to test the packet repeatedly. The node instead retrieves the key matching the packet public key field and tests the packet once. This increased efficiency in testing is achieved as a result of increased packet size, however. Thus the advantage of greater node packet processing efficiency must be weighed against the disadvantage of reduced available network bandwidth when deciding whether or not to include the key in the packets.

Two additional flags and associated packets may be utilized to enable a node to recover automatically from a node failure, that is, to re-gain the information stored in its volatile memory which was lost during the failure. The two flags are a SEND-RESTART-NOTIFICATION flag and a SEND-RESTART-NOTIFICATION-ACK flag.

A recovering node sets a SEND-RESTART-NOTIFICATION flag for each of its neighboring nodes. As the various communication links become available, the node sends to each of its neighbors send-restart packets. The send-restart packets contain just enough information to convey to the neighboring nodes that the node at the other end of the communication link is recovering from a failure.

In response to receiving the send-restart packet, a neighbor sets the SEND-RESTART-NOTIFICATION-ACK flag associated with the recovering node. When the communication link between the neighbor and the recovering node is next available the neighbor sends to the recovering node a restart-notification acknowledgment packet. The neighboring node then sets, for all the data packets in its memory, the PACKET SEND flags corresponding to communication links leading to the recovering neighbor. Thereafter, the recovering node receives copies of each of the data packets, allowing it to re-fill its memory.

The recovering node performs the operations of a receiving node set forth above, that is, storing only the valid data packets with the highest sequence numbers, and so forth. The recovering node is informed of its own sequence number by comparing the sequence numbers of the received packets listing it as the originating node and restarting its count with the highest received sequence number.

As set forth above, each node has certain information stored in non-volatile memory. This information consists of (i) its own identifier, (ii) its own public and private keys, (iii) the trusted node identifiers and their public keys, (iv) the maximum number of nodes allowed on the network, and (v) the maximum size of a packet. By storing this information in non-volatile memory the node is capable of performing recovery operations after a failure, without manual intervention. The node has enough information to eventually regain valid PKL packets and start filling its memory locations associated with regular network nodes. If the node loses any of the information stored in non-volatile memory during the failure, it must be re-started manually before it can perform a recovery operation.

The robust flooding scheme may operate without send and acknowledgment packets and PACKET SEND and ACK flags and/or without restart-notification and restart-acknowledgement packets and flags. A node operating without any of these packets and flags transmits to its neighbors the newest packet associated with each originating node until newer packets are received. The node thus scans its database in "round-robin" fashion and repeatedly transmits each of the data packets, in order, over the various communication links. While this method of transmittal is robust, it is inefficient in terms of network bandwidth because valid packets which have already been received by a neighboring node are re-transmitted.

The robust broadcasting scheme may also be used to send a packet from an originating node to another specific node, that is, a destination node. To do this the packet header section 32 (FIG. 2) is enlarged to include a destination node identity field. When the originating node generates the packet it places the node identifier for the destination node in this field. The node then broadcasts the packet as set forth above with reference to FIG. 3. When a node receives the packet it tests the validity and vintage of the packet as set forth above with reference to FIGS. 4A and 4B. It also examines the destination node identity field to determine if it is the node to which the packet is directed. If the receiving node is the destination node, the node does not transmit the packet to its neighbors. If it is not the destination node, the node queues the packet for further transmission.

Figure 7:
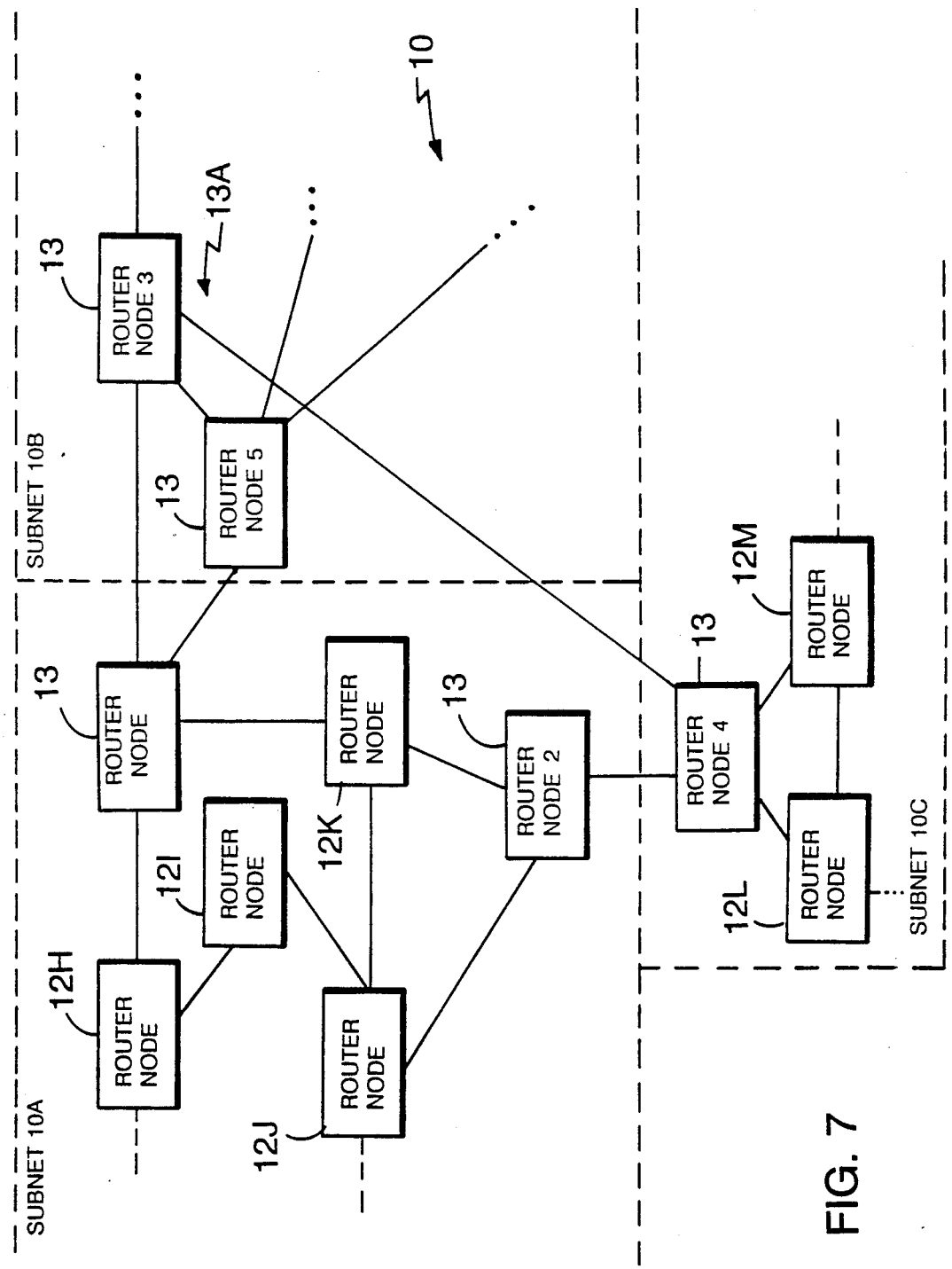
FIG. 7 is an illustration of a hierarchical network.

Broadcasting packets over networks which are partitioned into several sub-networks, that is, over hierarchical networks, may be accomplished using the robust broadcasting scheme. FIG. 7 illustrates a network 10 which is sub-divided into several sub-networks 10A-10C. Each node sub-network 10A-10C, referred to as a level 1 network contains one or more nodes which are capable of transmitting packets from a level 1 sub-network to another level of sub-network, namely, a level 2 sub-network. These nodes, referred to as level 2 routers 13, are interconnected to form a level 2 sub-network 13A. When a packet is to be transmitted from one level 1 sub-network to another level 1 sub-network, the packet travels over the originating level 1 sub-network, the level 2 sub-network 13A and finally the second level 1 sub-network. The broadcasting of packets over the various sub-networks is discussed in more detail below.

Each level 2 router 13 functions as a node on both a level 1 sub-network and a level 2 sub-network. In order for a level 2 router to broadcast packets on both sub-networks to which it has access, it must know the identifiers and public keys associated with the nodes on both of the sub-networks. Thus the level 2 routers 13 receive PKL packets from the trusted nodes on both of the sub-networks. The level 2 routers are the only nodes which require such information about more than one sub-network. The nodes on the level 1 sub-network which are not level 2 routers store information concerning only the nodes on their level 1 sub-network. Thus each node is not required to maintain information about the complete network, which may consist of many sub-networks, in order to broadcast packets destined for one or more nodes on a different sub-network.

When a node in a level 1 sub-network, i.e., 12K, originates a packet which is to be transmitted over one or more of the other level 1 sub-networks, i.e., sub-networks 10A and 10B, it first robustly broadcasts the packet over its own sub-network. When the packet reaches a level 2 router 13, the router 13 transmits the packet onto the level 2 sub-network 13A and the various level 2 routers 13, as appropriate, robustly broadcast the packet over the level 1 sub-networks to which they have access.

The header section 32 (FIG. 2) of a packet which is to be transmitted over two or more sub-networks is enlarged to contain a sub-network field. The sub-network field contains one or more symbols which indicate the sub-networks to which the packet is to be transmitted.

When a level 2 router 13 receives a valid packet with a sub-network field which indicates that the packet is to be transmitted to one or more of the sub-networks, it broadcasts the packet onto the level 2 sub-network 13A as well as further broadcasting it over the originating node level 1 sub-network 10A. Before the level 2 router 13 transmits the packet to the level 2 sub-network 13A it overwrites the packet header section with its own node identifier, sequence number, public key, and digital-signature codeword. It also changes the sub-network field to indicate that the packet is being transmitted onto the level 2 sub-network 13A and that it is directed to one or more of the attached level 1 sub-networks 10A-10C.

The level 2 router 13 revises the packet for two reasons. First, it revises the packet to enable the level 2 routers 13 on the level 2 sub-network 13A to recognize the packet as one originated by a level 2 router, that is, a node listed in the PKL packets received from the level 2 subnetwork trusted nodes. The second reason the level 2 router 13 revises the packet header section, and in particular the packet sub-network field, is to prevent the level 2 routers 13 from re-routing the packet back to the originating level 1 sub-network and broadcasting it on that sub-network as a packet originated by the router. The level 2 router 13, receiving the packet over the level 1 network, may again reroute the packet back to the level 2 sub-network, etc. The nodes may thus continue to broadcast the packet around the two sub-networks in an infinite loop.

When a level 2 router 13 having access to a sub-network to which the packet is directed receives the packet, it again overwrites the packet sub-network field to indicate that the packet is being transmitted onto a level 1 sub-network 10B. The packet is then robustly broadcast over the sub-network as described above with reference to FIG. 3. When a level 2 router 13 on this level 1 sub-network receives the packet it will not re-route it to the level 2 sub-network.

The robust flooding scheme facilitates automatic detecting and diagnosing of certain types of network faults. The faults may be reported to a network manager who may then remedy the problem. For example, a node may detect a problem if it fails to receive from a particular trusted node a node identifier/public key list, or if it receives from a particular trusted node a list containing too many or too few nodes. The node may then report the problem to the network manager which then investigates it. The cause of the problem may be that the trusted node is faulty, or it may be that the neighbors of the trusted node are faulty and refusing to transmit packets originated by the trusted node. In either case, a network fault is diagnosed and presumably remedied.

A higher level network protocol may detect that packets originated by a particular node never reach a specific destination node. This indicates that there are no fault-free paths between the originating node and the destination node. The network manager may then query each node to determine if it received a particular packet. Each node checks its memory location associated with the packet originating node and responds to the query. If the network manager knows the true network topology it can limit its fault detection activities to nodes which do not have stored the same packet as their neighbors.

The robust flooding transmittal scheme enables network nodes to transmit data effectively, even if some of the network nodes are operating improperly. Each node transmits only valid and new packets: each time a node receives a packet it first verifies that the packet is valid and then determines the relative vintage of the packet. Packets containing node identifying information are verified as valid and new before use, also. Accordingly, corrupted or altered information from improperly operating nodes does not disrupt packet transmission.

A receiving node determines if a packet is valid by manipulating the packet contents, including the packet digital-signature code word and the public key. While a node may alter the packet contents, it can not generate a corresponding digital-signature code word because it does not have access to the originating node's private key. Thus a receiving node easily detects the alteration of the packet. The receiving node then discards the altered packet before it is used by any other network device.

The receiving node determines if the received packet is newer than a previously received packet from the same originating node by comparing the packet with a stored packet. The newer packet should contain a larger sequence number. If the received packet is not the newest, that is, it is older than or the same vintage as the stored packet, the node presumably processed the packet at an earlier time. Therefore, the receiving node discards the duplicate packet. By removing these packets from the network, the node frees other nodes from the task of processing the duplicate packets, and it also leaves open for transmission of new packets the corresponding communication links.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the

What is claimed is:

1. A method for transmitting data over a network of nodes interconnected by communication links comprising the steps of:
   A. forming a data packet at an originating node, said packet containing
      1. an identifier identifying the originating node and
      2. a count of the packets formed by the originating node;
   B. transmitting the packet over at least one of the communication links to a neighboring node;
   C. at each neighboring node that receives determining whether the packet is valid and is the newest valid packet formed by the originating node and received by the neighboring node by comparing the count with a stored count corresponding to a previously received from the same originating node, said previously received packet being the newest valid packet previously received by the node;
   D.
      1. for each received packet determined to be the newest valid packet at a given node
         i. storing at least the packet count in a memory location at the given node which is associated with the originating node; and
         ii. queuing the packet for transmission over a communication link to at least one of the neighbors of the node, and
         iii. transmitting the packet when an appropriate communication link is available;
      2. if the packet is a duplicate of an earlier received packet, discarding the packet; and
   E. repeating steps C and D until the packet is transmitted to every node.

2. The transmittal method of claim 1, wherein said method further includes:
   A. in the step of queuing a packet for transmission, setting one or more flags which are associated with the packet and also correspond to the communication links over which the packet is to be transmitted;
   B. in step D.1.iii., when a given communication link becomes available 1. searching the memory locations associated with the network originating nodes for a set flag corresponding to the available communication link,
   2. transmitting the packet corresponding to the set flag, and
   3. if the communication link continues to be available repeating steps 1 and 2.

3. The transmittal method of claim 2, wherein said step of determining whether a packet is the newest valid packet associated with the originating node includes:
   A. if the count in the received packet is larger than the stored count, determining the received packet is the newest;
   B. if the count in the received packet is smaller than the stored count, determining the received packet is older; and
   C. if the count in the received packet is equal to the stored count, designating the received packet as either the newest packet or an older packet.

4. The transmittal method of claim 3, wherein said method further includes:
   A. in the packet forming step
      1. encoding a predetermined portion of the contents of the packet using a private code associated with the originating node to form a digital-signature code word, said private code being unavailable to the other nodes on the network,
      2. including the digital-signature code word in the packet; and
   B. in the step of determining if the received packet is the newest valid packet associated with the originating node
      1. manipulating the packet contents and the packet digital-signature code word and a public code associated with the originating node to generate an output value; and
      2. analyzing the output value to determine both if the packet was originated by the listed originating node and if the packet contents were unaltered during transmission;

5. The transmittal method of claim 4, wherein said step of determining if the received packet is the newest valid packet associated with the packet originating node includes, for a received packet containing a count equal to the stored count, comparing the digital-signature code word in the received packet with the digital-signature code word in the stored packet and determining that the received packet is a duplicate of the stored packet if the code words are the same.

6. The transmittal method of claim 5, wherein said method includes the step of sending an acknowledgment to the transmitting node if the packet received by the neighbor is determined by the neighbor to be the newest valid packet associated with the originating node.

7. The transmittal method of claim 2, wherein said step of storing the packet count determined to be the newest valid packet associated with the originating node includes storing the entire packet in the memory location.

8. The transmittal method of claim 7, wherein said transmittal method includes, if the given node is storing a packet associated with the same originating node as the received packet which has a larger count than the received packet, sending a copy of the stored packet to the neighboring node from which the received packet was received.

9. The transmittal method of claim 1. wherein step B. includes transmitting the packet over every attached communication link to every neighboring node of the originating node; and step D. includes transmitting the packet to each of the neighboring nodes, except the node from which the packet was received.

10. A method of determining if transmissions over a network of nodes interconnected by communication links are reliable comprising the steps of:
   A. sending to every node on the network one or more packets containing a list of nodke-identifier information and associated public code information, said list containing information from which to identify the nodes on the network;
   B. when a node receives a transmmission over the network, said transmission containing an identifier identifying the node originating the transmission and a digital-signature code word generated by encoding predetermined portions of the transmission, verifying that the transmission was originated by the identified originating node by:
      1. manipulating the packet contents, including the public code associated with the originating node, to generate a second digital-signature code word,
      2. analyzing the second digital-signature code word to determine if it corresponds to the digital signature code word in the transmission, and
      3. determining that the listed originating node originated the transmission if the second digital-signature code word corresponds to the digital-signature code word in the transmission, or that the transmission was not originated by the listed originating node if the digital-signature code words do not correspond.

11. The transmission verifying method of claim 10, wherein said sending step includes:
   A. storing in each node node-identifier and associated public code information for a predetermined number of nodes;
   B. sending from said predetermined number of nodes to the network nodes a packet containing a list of node-identifying and associated public code information relating to the other nodes on the network;
   C. at each receiving node determining whether said node-identification and public code information originated from one of said predetermined number of nodes by
      1. retrieving the stored public code associated with the listed originating node,
      2. manipulating the contents of the packet, including the digital-signature code word, and the public key using the retrieved public code word,
      3. analyzing the results of the manipulation to determine if the digital-signature code word corresponds to the transmission,
      4. determining that the listed originating node originated the transmission if the digital-signature code word corresponds to the transmission, or that the transmission was not originated by the listed originating node if they do not correspond,
      5. storing the packet node identification and public code information if the transmission is determined to be valid, and
      6. allocating memory locations for each identified node.

12. The verifying method of claim 11, wherein said sending step further includes, if contradictory lists are received from one or more of said predetermined number of nodes, storing all the information which is verified, and allocating a memory location for each node identified on either list.

13. The verification method of claim 11, wherein said determining step further includes, if contradictory information is received from said predetermined number of nodes, trying each code associated with the packet originating node until the packet contents are verified or until all the associated codes are tried.

14. The verification method of claim 10, wherein said transmission further includes a count representing the number of transmissions originated by the originating node.

15. The verification method of claim 14, wherein said verification step includes:
   A. comparing the count in the received transmission with the count in a transmission received previously which was originated by the same originating node;
   B.
      1. if the count in the recently received transmission is larger than the count in the previously received transmission, determining that the received transmission is newer;
      2. if the count in the recently received transmission is smaller than the count in the previously received transmission, determining that the recently received transmission is older.

16. The verification method of claim 15 wherein if the count in the recently received transmission is equal to the count in the previously received transmission, the transmission with the numerically greater digital-signature code word is designated as the newer transmission.

17. The verification method of claim 15 wherein if the count in the recently received transmission is equal to the count in the previously received transmission, the transmission with the numerically lesser digital-signature code word is designated as the newer transmission.

18. A method of transmitting data in a packet over a network of nodes interconnected by communication links, comprising:
   including said transmitted data in a data section of the packet;
   including in the packet an identifier identifying the node which originated the packet;
   including in the packet a count of the number of packets formed by the originating node;
   generating a digital-signature code word by manipulating a public code associated with the originating node and a predetermined portion of the contents of the packet, and
   including said digital-signature code word in the packet in addition to said transmitted data.

19. The method of claim 18, further comprising including in the packets a public code associated with the packet originating node, said public code being related to the code used to generate the digital-signature code word.

* * * * *

UNITED STATES PATENT AND TRADEMARK OFFICE
CERTIFICATE OF CORRECTION

PATENT NO. : 5,175,765

DATED : December 29, 1992

INVENTOR(S) : Radia Perlman

It is certified that error appears in the above-indentified patent and that said Letters Patent is hereby corrected as shown below:

Column 15, line 23, insert --invention.-- after "the".

Column 15, line 35, insert --a packet,-- after "receives".

Column 15, line 40, insert --packet-- after "received".

Column 17, line 13, change --nodke-- to "node".

Signed and Sealed this

Twenty-fifth Day of January, 1994

Attest:

BRUCE LEHMAN

Attesting Officer

Commissioner of Patents and Trademarks